United States Patent
Hayman et al.

(10) Patent No.: US 10,416,329 B2
(45) Date of Patent: Sep. 17, 2019

(54) COHERENT NOISE ESTIMATION AND REDUCTION FOR ACOUSTIC DOWNHOLE MEASUREMENTS

(71) Applicant: Schlumberger Technology Corporation, Sugar Land, TX (US)

(72) Inventors: Andrew John Hayman, Clamart (FR); Thomas Barrou, Clamart (FR)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 55 days.

(21) Appl. No.: 15/337,353

(22) Filed: Oct. 28, 2016

(65) Prior Publication Data
US 2017/0168183 A1    Jun. 15, 2017

(30) Foreign Application Priority Data

Dec. 15, 2015  (EP) .................................... 15290316

(51) Int. Cl.
*G01V 1/48*    (2006.01)

(52) U.S. Cl.
CPC ........ *G01V 1/48* (2013.01); *G01V 2210/3246* (2013.01); *G01V 2210/34* (2013.01)

(58) Field of Classification Search
CPC ................. G01V 1/48; G01V 2210/34; G01V 2210/3246
USPC ......................................................... 367/25
See application file for complete search history.

(56) References Cited

U.S. PATENT DOCUMENTS

| | | | |
|---|---|---|---|
| 5,216,638 A | 6/1993 | Wright | |
| 6,470,275 B1 | 10/2002 | Dubinsky | |
| 8,505,625 B2 * | 8/2013 | Ravi | E21B 33/14 166/250.14 |
| 2014/0010045 A1 | 1/2014 | Bennett et al. | |
| 2015/0177405 A1 | 6/2015 | Jannin et al. | |
| 2016/0178779 A1 | 6/2016 | Barrou et al. | |

FOREIGN PATENT DOCUMENTS

| | | |
|---|---|---|
| GB | 2339908 A | 2/2000 |
| WO | WO2015163852 A1 | 10/2015 |

OTHER PUBLICATIONS

Extended European Search Report issued in the related EP Application 15290316.7, dated Jun. 24, 2016 (9 pages).

* cited by examiner

*Primary Examiner* — Daniel L Murphy
(74) *Attorney, Agent, or Firm* — Sara K.M. Hinkley

(57) ABSTRACT

A system includes an acoustic logging tool including a transducer configured to: emit a first acoustic pulse in a first direction toward a first acoustic surface; measure a first acoustic signal, wherein the first acoustic signal includes a coherent noise component and a first echo component, wherein the first echo component is due at least in part to an interaction of the first acoustic pulse with the first acoustic surface; emit a second acoustic pulse in a second direction, wherein the second direction is at least partly directed away from the first acoustic surface; and measure a second acoustic signal, wherein the second acoustic signal includes substantially only the coherent noise component. The system also includes a data processing system that includes a processor configured to remove the measurement of the second acoustic signal from the measurement of the first acoustic signal to reduce coherent noise.

18 Claims, 6 Drawing Sheets

COHERENT NOISE ESTIMATION AND REDUCTION FOR ACOUSTIC DOWNHOLE MEASUREMENTS

CROSS-REFERENCE TO RELATED APPLICATIONS

The present invention claims the benefits of European Patent Application No. 15290316.7, filed on Dec. 15, 2015, titled "Coherent Noise estimation and reduction for Acoustic Downhole measurements," the entire content of which is hereby incorporated by reference into the current application.

BACKGROUND

The present disclosure relates generally to acoustic measurements. In particular, the present disclosure relates to accurately measuring coherent noise and removing the coherent noise from the acoustic measurements.

This section is intended to introduce the reader to various aspects of art that may be related to various aspects of the present techniques, which are described and/or claimed below. This discussion is believed to be help provide the reader with background information to facilitate a better understanding of the various aspects of the present disclosure. Accordingly, it should be understood that these statements are to be read in this light, and not as admissions of prior art.

A wellbore may be drilled into a geological formation to extract oil and/or gas from the geological formation. Logging tools may determine a variety of characteristics of the wellbore and/or the geological formation. Logging tools may determine characteristics of the surrounding rock formation. Logging tools may also determine whether cement injected around the wellbore properly achieves zonal isolation. That is, to prevent the certain zones of the geological formation from interacting with one another within the wellbore and to prevent fluids from undesired zones entering the wellbore, the wellbore may be constructed by inserting a cylindrical casing into the wellbore and injecting the cement injected into an annulus between the casing and a wall of the wellbore (i.e., the geological formation). When the cement properly sets, fluids from one zone of the geological formation may be prevented from passing through the wellbore to interact with one another. However, the cement may not set as planned and/or the quality of the cement may be less than expected. Additionally, the cement may unexpectedly fail to set above a certain depth due to natural fissures in the geological formation.

A variety of acoustic (e.g., sonic or ultrasonic) tools may be used to verify that the cement is properly installed. These acoustic tools may produce and measure pulse acoustic waves through the wellbore to obtain acoustic cement evaluation data at various depths and azimuths in the wellbore. However, recent developments in drilling and constructing the wellbore may reduce the strength of an acoustic signal to be measured. For example, the wellbore is increasingly drilled using heavier drilling fluids and constructed using thicker casings, which may attenuate the acoustic signal more than lighter drilling fluids and thinner casings. In addition, well casings are increasingly being installed using lighter cements that have acoustic properties more similar to fluids than heavier cements. To account for these developments, the operating frequency of acoustic logging tools may be reduced, but doing so may introduce additional noise due to acoustic tool electronics and intrinsic noise of a transducer of the acoustic logging tools. This may especially be the case when using the transducer for both excitation and measurement.

SUMMARY

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

Embodiments of the disclosure relate generally to improving coherent noise measurement, particularly by reducing pulse-echo ultrasonic measurements. In a first embodiment, a system includes an acoustic logging tool including a transducer, wherein the transducer is configured to emit a first acoustic pulse from the transducer in a first direction toward a first acoustic surface. The transducer is also configured to measure a first acoustic signal for at least a first amount of time after emitting the first acoustic pulse, wherein the first acoustic signal over the first amount of time includes a coherent noise component and a first echo component, wherein the first echo component is due at least in part to an interaction of the first acoustic pulse with the first acoustic surface. The transducer is further configured to emit a second acoustic pulse from the transducer in a second direction, wherein the second direction is at least partly directed away from the first acoustic surface. The transducer is also configured to measure a second acoustic signal for at least the first amount of time after emitting the second acoustic pulse, wherein the second acoustic signal over the first amount of time includes substantially only the coherent noise component. The system also includes a data processing system communicatively coupled to the acoustic logging tool, wherein the data processing system includes a processor, wherein the processor is configured to receive the measurement of the first acoustic signal and the measurement of the second acoustic signal. The processor is also configured to remove the measurement of the second acoustic signal over the first amount of time from the measurement of the first acoustic signal over the first amount of time to reduce coherent noise from the measurement of the first acoustic signal.

In a second embodiment, a method includes orienting a transducer of an acoustic logging tool such that an end of the transducer is directed at a first acoustic surface a first distance from the end of the transducer, wherein the end of the transducer comprises an emission or detection end of the transducer. The method also includes emitting a first acoustic pulse from the end of the transducer at a first time. The method further includes measuring a first acoustic signal including a first echo of the first acoustic pulse due to an interaction of the first acoustic pulse with the first acoustic surface using the transducer at or before a second time. The method also includes obtaining, with a processor, the measurement of the first acoustic signal between the first time and the second time. The method further includes orienting the transducer such that the end of the transducer is directed at a second acoustic surface a second distance from the end of the transducer, wherein the second distance is greater than the first distance. The method also includes emitting a second acoustic pulse from the end of the transducer at a third time. The method further includes measuring a second acoustic signal using the transducer at or before a fourth time, wherein the second acoustic signal comprises a second echo due to an interaction of the second acoustic pulse with the second acoustic surface, wherein the second echo occurs after the fourth time. The method also includes obtaining, with the processor, the measurement of the second acoustic signal between the third time and the fourth time. The method further includes removing, with the processor, at least part of the measurement of the second acoustic signal from the measurement of the first acoustic signal to reduce coherent noise from the measurement of the first acoustic signal.

In a third embodiment, an article of manufacture includes one or more tangible, non-transitory machine-readable media including instructions to receive a measurement of a first acoustic signal resulting when a transducer of a downhole tool emits a first acoustic pulse in a first direction toward a first surface in a wellbore, wherein the measurement of the first acoustic signal comprises at least a first amount of time after the emission of the first acoustic pulse, wherein the first acoustic signal over the first amount of time comprises a coherent noise component and a first echo component, wherein the first echo component is due at least in part to an interaction of the first acoustic pulse with the first surface in the wellbore. The one or more tangible, non-transitory machine-readable media also includes instructions to receive a measurement of a second acoustic signal resulting when the transducer of the downhole tool emits a second acoustic pulse in a second direction, wherein the second direction is at least partly directed away from the first acoustic surface, wherein the measurement of the second acoustic signal comprises at least the first amount of time after the emission of the second acoustic pulse, wherein the second acoustic signal over the first amount of time comprises substantially only the noise component. The one or more tangible, non-transitory machine-readable media further includes instructions to remove at least part of the measurement of the second acoustic signal from the measurement of the first acoustic signal to reduce coherent noise from the measurement of the first acoustic signal.

BRIEF DESCRIPTION OF THE DRAWINGS

Various aspects of this disclosure may be better understood upon reading the following detailed description and upon reference to the drawings in which.

DETAILED DESCRIPTION

Figure 1:
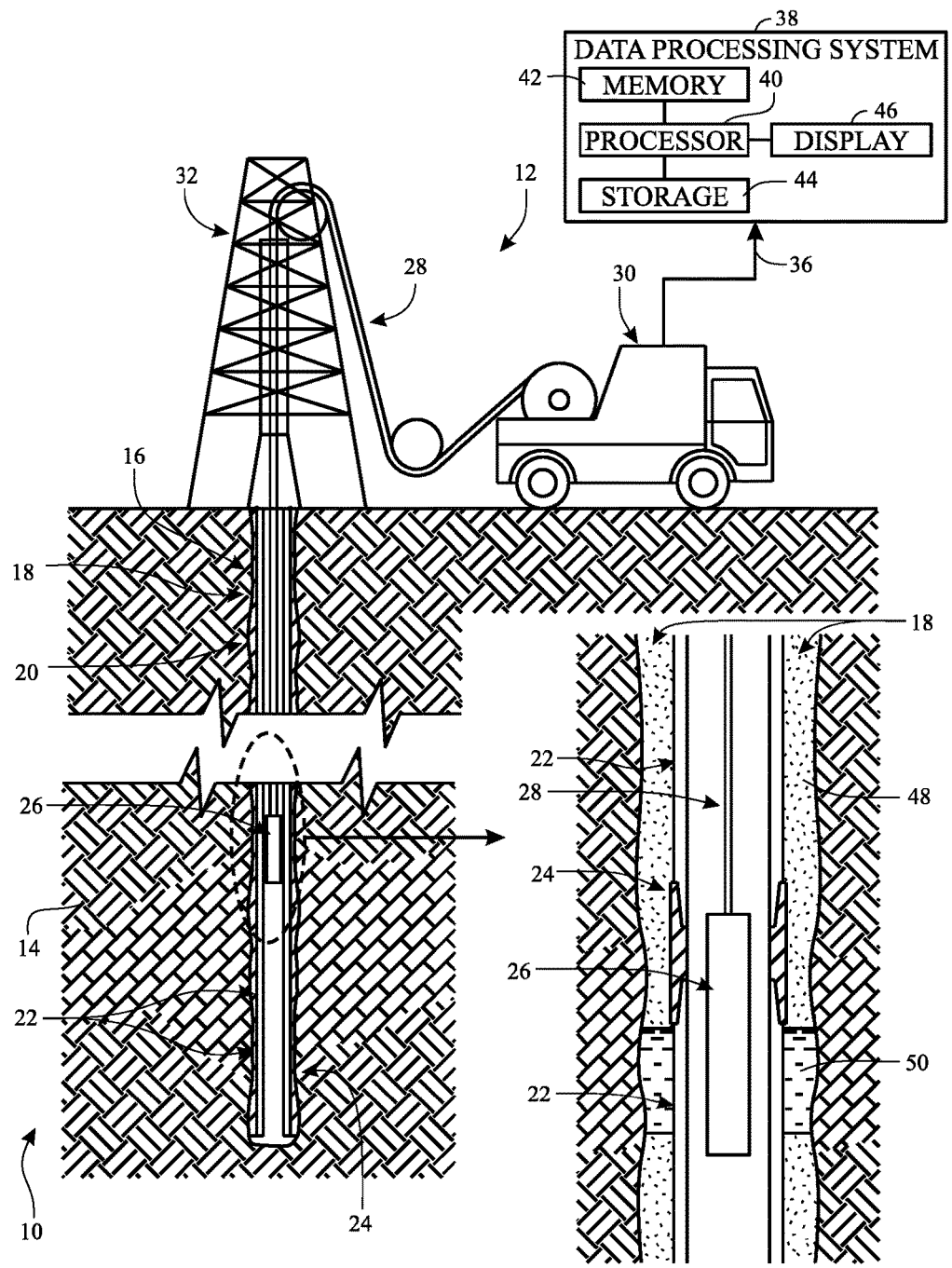
FIG. 1 is a schematic diagram of a system for obtaining well logging data in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

When a well is drilled, a variety of logging tools may be used to determine characteristics of the well. These characteristics may include parameters of the surrounding geological formation, the shape and texture of the wellbore, or the quality of cement installation behind a casing, to name a few. When logging data is obtained in the well, a downhole logging tool is moved through the well to obtain certain physical measurements. By processing these physical measurements, the characteristics of the well may be estimated. In the case of cement evaluation, for example, an acoustic logging tool may emit pulses of acoustic energy against a casing of the wellbore and measure the acoustic waveforms that return. Because the returning waveforms vary depending on the quality of the cement installation behind the casing—varying, for example, on whether the material behind the casing has acoustic properties more like a liquid, gas, or solid—the returning waveforms can be used to ascertain whether the material on the other side of the casing is a solid, and therefore likely to be properly installed cement. Other downhole tools may ascertain other well characteristics by, for example, emitting electromagnetic signals or radiation and detecting signals that return.

As mentioned above, recent developments in well drilling, such as heavier drilling fluids and lighter cement, may reduce the ability of acoustic logging tools to effectively determine cement quality. To account for these developments, the operating frequency of acoustic logging tools may be reduced, but doing so may introduce additional noise due to acoustic tool electronics and intrinsic noise of a transducer of the acoustic logging tools. This may especially be the case when using the transducer for excitation and measurement. Indeed, it is believed that the electronic circuitry of these tools may also produce a noise background that may be detected in the return signals. When an acoustic pulse is emitted and a return signal detected by the transducer and converted into an electrical signal for processing, the electronic circuitry of the tool may introduce noise into the electrical representation of the return signal. This noise may be coherent—that is, the noise may consistently tend to occur at the same points in time in relation to some starting point (e.g., from the initial generation of the acoustic pulse), even though the individual return signals may have different delays. This disclosure will focus on accurately measuring such coherent noise from downhole logging data for the purpose of removing the coherent noise from the downhole logging data.

With this in mind, FIG. 1 is a schematic diagram illustrating a system 10 for measuring and removing coherent noise in logging data obtained by a downhole tool 26 (e.g., an acoustic logging tool). In particular, FIG. 1 illustrates surface equipment 12 above a geological formation 14. In the example of FIG. 1, a drilling operation has previously been carried out to drill a wellbore 16. In addition, an annular fill 18 (e.g., cement) has been used to seal an annulus 20—the space between the wellbore 16 and casing joints 22 and collars 24—with cementing operations. The downhole tool 26 may be centered or eccentered, such that a measuring and/or detecting device (e.g., a transducer) of the downhole tool is positioned in a center of the downhole tool 26 or not in the center of the downhole tool 26.

As seen in FIG. 1, several casing joints 22 (also referred to below as casing 22) are coupled together by the casing collars 24 to stabilize the wellbore 16. The casing joints 22 represent lengths of pipe, which may be formed from steel or similar materials. In one example, the casing joints 22 each may be approximately 13 m or 40 ft long, and may include an externally threaded (male thread form) connection at each end. A corresponding internally threaded (female thread form) connection in the casing collars 24 may connect two nearby casing joints 22. Coupled in this way, the casing joints 22 may be assembled to form a casing string to a suitable length and specification for the wellbore 16. The casing joints 22 and/or collars 24 may be made of carbon steel, stainless steel, or other suitable materials to withstand a variety of forces, such as collapse, burst, and tensile failure, as well as chemically-aggressive fluid.

The surface equipment 12 may carry out various well-logging operations to detect conditions of the wellbore 16. The well logging operations may measure parameters of the geological formation 14 (e.g., resistivity or porosity) and/or the wellbore 16 (e.g., temperature, pressure, fluid type, or fluid flowrate). Other measurements may provide acoustic cement evaluation data (e.g., flexural attenuation and/or acoustic impedance) that may be used to verify the cement installation and the zonal isolation of the wellbore 16. One or more acoustic logging tools 26 may obtain some of these measurements.

The example of FIG. 1 shows the acoustic logging tool 26 being conveyed through the wellbore 16 by a cable 28. Such a cable 28 may be a mechanical cable, an electrical cable, or an electro-optical cable that includes a fiber line protected against the harsh environment of the wellbore 16. In other examples, however, the acoustic logging tool 26 may be conveyed using any other suitable conveyance, such as coiled tubing. The acoustic logging tool 26 may be, for example, an UltraSonic Imager tool and/or an Isolation Scanner tool by Schlumberger Technology Corporation. The acoustic logging tool 26 may obtain measurements of acoustic impedance from ultrasonic waves and/or flexural attenuation. For instance, the acoustic logging tool 26 may obtain a pulse echo measurement that exploits the thickness mode (e.g., in the manner of an ultrasonic imaging tool) or may perform a pitch-catch measurement that exploits the flexural mode (e.g., in the manner of the Isolation Scanner). These measurements may be used as acoustic cement evaluation data to identify likely locations where solid, liquid, or gas is located in the annulus 20 behind the casing 22.

The acoustic logging tool 26 may be deployed inside the wellbore 16 by the surface equipment 12, which may include a vehicle 30 and a deploying system such as a drilling rig 32. Data related to the geological formation 14 or the wellbore 16 gathered by the acoustic logging tool 26 may be transmitted to the surface, and/or stored in the acoustic logging tool 26 for later processing and analysis. The vehicle 30 may be fitted with or may communicate with a computer and software to perform data collection and analysis.

FIG. 1 also schematically illustrates a magnified view of a portion of the cased wellbore 16. As mentioned above, the acoustic logging tool 26 may obtain acoustic cement evaluation data relating to the presence of solids, liquids, or gases behind the casing 22. For instance, the acoustic logging tool 26 may obtain measurements of acoustic impedance and/or flexural attenuation, which may be used to determine where the material behind the casing 22 is a solid (e.g., properly-set cement) or is not solid (e.g., is a liquid or a gas). When the acoustic logging tool 26 provides the measurements to the surface equipment 12 (e.g., through the cable 28), the surface equipment 12 may pass the measurements as acoustic cement evaluation data 36 to a data processing system 38 that includes one or more processor 40, one or more memory devices 42, storage 44, and/or a display 46. Further references to "the processor 40" are intended to include the one or more processors 40. In some embodiments, the processor 40 may include one or more microprocessors, one or more application specific processors (ASICs), one or more field programmable logic arrays (FPGAs), or any combination thereof. The processor 40 may execute instructions stored in the memory 42 and/or storage 44. As such, the memory 42 and/or the storage 44 of the data processing system 38 may be tangible, non-transitory, machine-readable media that store instructions executable by and data to be processed by the processor 40. The memory 42 and/or the storage 44 may be ROM memory, random-access memory (RAM), flash memory, an optical storage medium, or a hard disk drive, to name a few examples. The display 46 may be any suitable electronic display that can display the logs and/or other information relating to classifying the material in the annulus 20 behind the casing 22.

In other examples, the acoustic cement evaluation data 36 may be processed by a similar data processing system 38 at any other suitable location. The data processing system 38 may collect the acoustic cement evaluation data 36 and reduce coherent noise as taught in the present disclosure. After reducing the coherent noise, the data processing system 38 may determine whether such data 36 represents a solid, liquid, or gas using any suitable processing (e.g., T3 processing, Traitement Très Tôt, or Very Early Processing). One example of this processing technique is described in U.S. Pat. No. 5,216,638, "Method and Apparatus for the Acoustic Investigation of a Casing Cemented in a Borehole," which is assigned to Schlumberger Technology Corporation and is incorporated by reference herein in its entirety for all purposes.

In this way, the acoustic cement evaluation data 36 from the acoustic logging tool 26 may be used to determine whether cement of the annular fill 18 has been installed as expected. In some cases, the acoustic cement evaluation data 36 may indicate that the cement of the annular fill 18 has a generally solid character (e.g., as indicated at numeral 48) and therefore has properly set. In other cases, the acoustic cement evaluation data 36 may indicate the potential absence of cement or that the annular fill 18 has a generally liquid or gas character (e.g., as indicated at numeral 50), which may imply that the cement of the annular fill 18 has not properly set. For example, when indicated that the annular fill 18 has the generally liquid character as indicated at numeral 50, this may imply that the cement is either absent or was of the wrong type or consistency, and/or that fluid channels have formed in the cement of the annular fill 18. By processing the acoustic cement evaluation data 36 to reduce the coherent noise, ascertaining the character of the annular fill 18 may be more accurate and/or precise than comparable processing when the coherent noise remains in the acoustic cement evaluation data 36.

Figure 2:
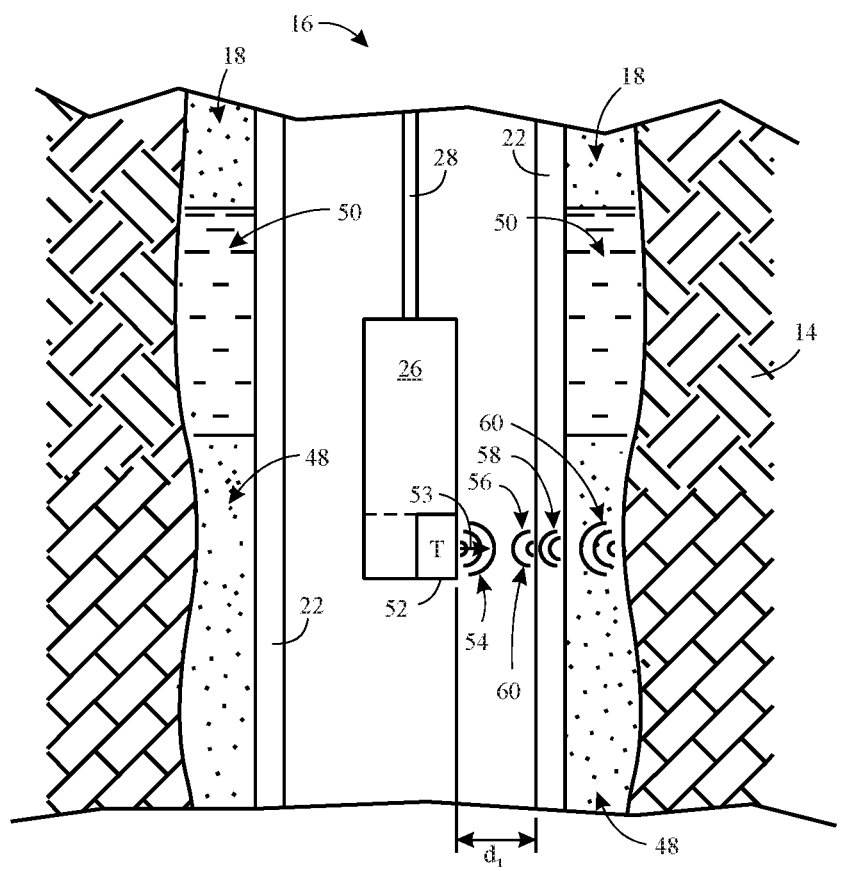
FIG. 2 is a schematic diagram of an acoustic logging tool with a transducer oriented in a first direction that may be used to obtain a first acoustic measurement in accordance with an embodiment.

With the foregoing in mind, FIG. 2 is a schematic diagram of the acoustic logging tool 26 that may be used to obtain a first acoustic measurement in accordance with an embodiment. In particular, a transducer 52 in the acoustic logging tool 26 may be oriented in a first direction 53 such that the transducer 52 may emit acoustic waves 54 directed at a first acoustic surface. The first acoustic surface may include a surface targeted by the acoustic logging tool 26 and/or for which the first acoustic measurement is sought. For example, the first acoustic surface may include the casing 22, the annular fill (e.g., the cement) 18, the geological formation 14, the wall of the wellbore 16, etc. The transducer 52 may be displaced a first distance $d_1$ in the first direction 53 from the first acoustic surface. The transducer 52 may detect reflected waves 56, 58, and 60 that may be a result of acoustic interactions between the acoustic waves 54 and the first acoustic surface. The reflected waves 56, 58, and/or 60 may arrive with varying amounts of delay because the acoustic waves 54 may travel correspondingly varying distances. The reflected waves 56, 58, and 60 may vary depending on whether the annular fill 18 is of the generally solid character 48 or the generally liquid or gas character 50. The acoustic logging tool 26 may use any suitable number of different techniques, including measurements of acoustic impedance from sonic waves or ultrasonic waves and/or flexural attenuation.

Figure 3:
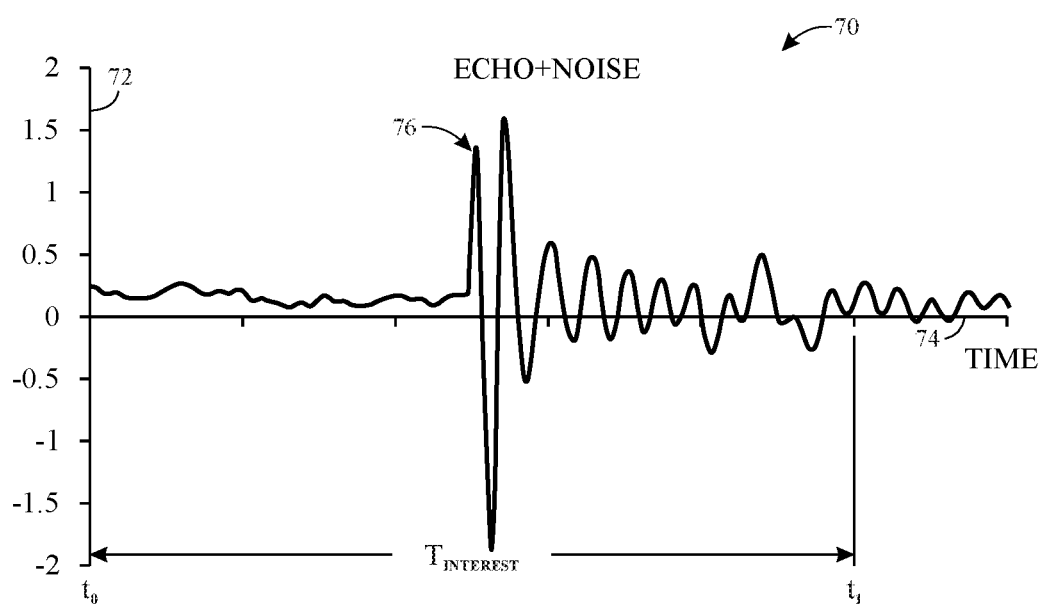
FIG. 3 is a plot of the first acoustic measurement obtained by the acoustic logging tool in accordance with an embodiment.

FIG. 3 is a plot 70 of an example of a first acoustic measurement obtained by the acoustic logging tool 26. The plot 70 has an ordinate 72 representing signal strength or amplitude in relation to an abscissa 74 representing time. The first acoustic measurement may take the form of a waveform of the plot 70 and may include an echo portion 76. The echo portion 76 may represent the initial reflection 56 of the acoustic pulse against the first acoustic surface (e.g., the casing 22, the annular fill (e.g., the cement) 18, the geological formation 14, the wall of the wellbore 16, etc.). The echo portion 76 may be used to determine a variety of parameters of the wellbore 16, including a thickness of the casing 22 and/or a quality of the annular fill 18. The portion of the measured acoustic signal that is of interest ($T_{interest}$) for determining these parameters may occur between a first time ($t_0$) and a second time ($t_1$). Measurements occurring after the second time ($t_1$) may be understood not to relate to the parameters of interest to be determined based on the first acoustic measurement. The first time ($t_0$) and the second time ($t_1$) may be understood to encompass the portion of the first acoustic measurement ($T_{interest}$) that may be used to determine parameters of the wellbore 16 (e.g., thickness of the casing 22 or quality of annular fill 18).

Figure 4:
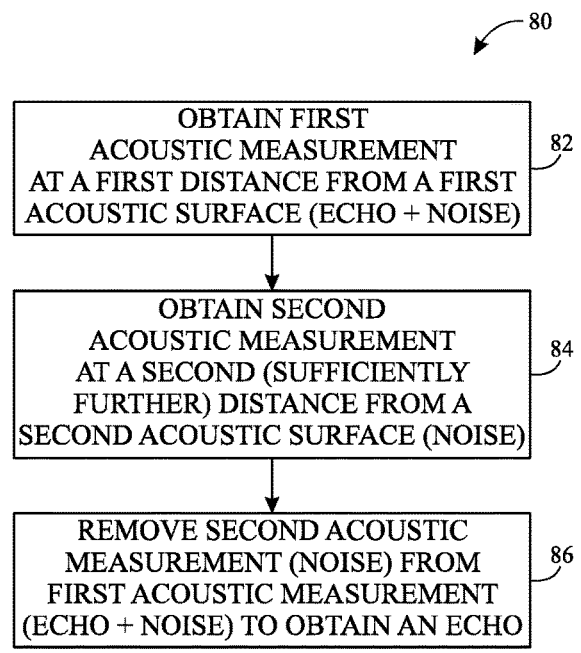
FIG. 4 is a flowchart of a method for measuring coherent noise and removing the coherent noise from acoustic measurements in accordance with an embodiment.

The first acoustic measurement may include coherent noise caused by electronics and/or the transducer 52 of the acoustic logging tool 26. To identify the coherent noise component of the first acoustic measurement, the acoustic logging tool 26 may obtain one or more additional measurements from a different distance. For example, as described in FIG. 4, a flowchart of a method 80 for measuring coherent noise and removing the coherent noise from acoustic measurements in accordance with an embodiment, the acoustic logging tool 26 may obtain (block 82) the first acoustic measurement at a first distance (e.g., $d_1$) from the first acoustic surface. The first acoustic measurement may include both the echo portion 76 and the coherent noise component.

The acoustic logging tool 26 may obtain (block 84) a second acoustic measurement at a sufficiently further distance from a second acoustic surface in the wellbore 16. The second acoustic surface in the wellbore 16 may include any surface that provides the echo portion 76 in the first acoustic measurement as a result of the initial reflection 56 of the acoustic pulse emitted from the transducer 52 against the surface. For example, the second acoustic surface may include the casing 22, the annular fill (e.g., the cement) 18, the geological formation 14, the wall of the wellbore 16, etc., provided that the distance is sufficiently further than the distance $d_1$. The sufficiently further distance from the second acoustic surface is any suitable distance from which the second acoustic measurement may include substantially just the coherent noise component (e.g., does not include the echo portion 76) within the time period of interest $T_{interest}$. This may be because the initial reflection 56 of the acoustic pulse emitted from the transducer 52 has not yet returned to the transducer 52 within the time period of interest $T_{interest}$, as will be discussed below with reference to FIGS. 5-8. The second acoustic measurement at the sufficiently further distance from the acoustic surface may be obtained by positioning the transducer 52 in a second direction 55 that is different from the first direction 53 used to obtain the first acoustic measurement such that the second acoustic measurement is at sufficiently further distance away from the second acoustic surface.

The data processing system 38 of the system 10 may remove the second acoustic measurement (the portion of the signal between times which is substantially due to coherent noise) from the first acoustic measurement to obtain the echo portion 76. In particular, the second acoustic measurement over the time period of interest $T_{interest}$ may be removed from the first acoustic measurement over the time period of interest $T_{interest}$. Because the second acoustic measurement may include the coherent noise component, but not the echo portion, within the time period of interest $T_{interest}$ and the first acoustic measurement may include the echo portion and the coherent noise component within the time period of interest $T_{interest}$, removing the second acoustic measurement from the first acoustic measurement over the time period of interest $T_{interest}$ may result in the echo portion 76 filtered of coherent noise. The echo portion 76 may be used to determine a variety of parameters of the wellbore 16, including a thickness of the casing 22 and/or a quality of the annular fill 18. It is appreciated that the data processing system 38 may remove the second acoustic measurement from the first acoustic measurement in either the time domain or the frequency domain. The data processing circuitry 38 may process the echo portion to determine cement quality with reduced distortion due to the coherent noise (block 122). The data processing circuitry 38 may use any suitable processing technique, including the T3 processing technique discussed above.

Figure 5:
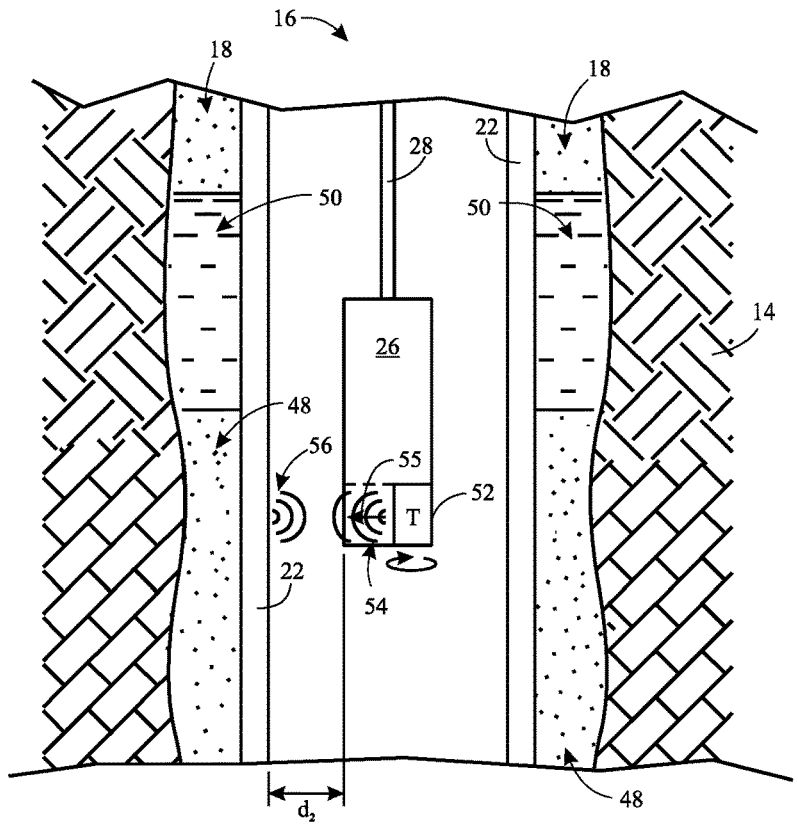
FIG. 5 is a schematic diagram of the acoustic logging tool with the transducer oriented in a second direction to obtain a second acoustic measurement in accordance with an embodiment.

The second acoustic measurement may be obtained by positioning the transducer 52 in the second direction 55 different from the first direction 53 used to obtain the first acoustic measurement such that the second acoustic measurement is the sufficiently further distance away from the second acoustic surface (e.g., the casing 22, the annular fill (e.g., the cement) 18, the geological formation 14, the wall of the wellbore 16, etc.). For example, FIG. 5 is a schematic diagram of the acoustic logging tool 26 with the transducer 52 oriented in the second direction 55 to obtain the second acoustic measurement in accordance with an embodiment. In particular, the transducer 52 may be adjusted such that transducer 52 is oriented in an opposite direction (i.e., the second direction 55) from the first direction 53 used to obtain the first acoustic measurement (as shown in FIG. 2). The transducer 52 may be displaced a second distance $d_2$ from the second acoustic surface, such that the second distance $d_2$ may be measured in the second direction 55. In the eccentered acoustic logging tool 26, due to the transducer 52 being eccentrically displaced within the acoustic logging tool 26, the second distance $d_2$ may be greater than the first distance $d_1$. In particular, the second distance $d_2$ is the sufficiently further distance from the second acoustic surface. The second distance $d_2$ may enable the second acoustic measurement to include the coherent noise component, but not include the echo portion 76, within the time period of interest $T_{interest}$. This may be because the initial reflection 56 of the acoustic pulse emitted from the transducer 52 has not yet returned to the transducer 52 within the time period of interest $T_{interest}$.

Figure 6:
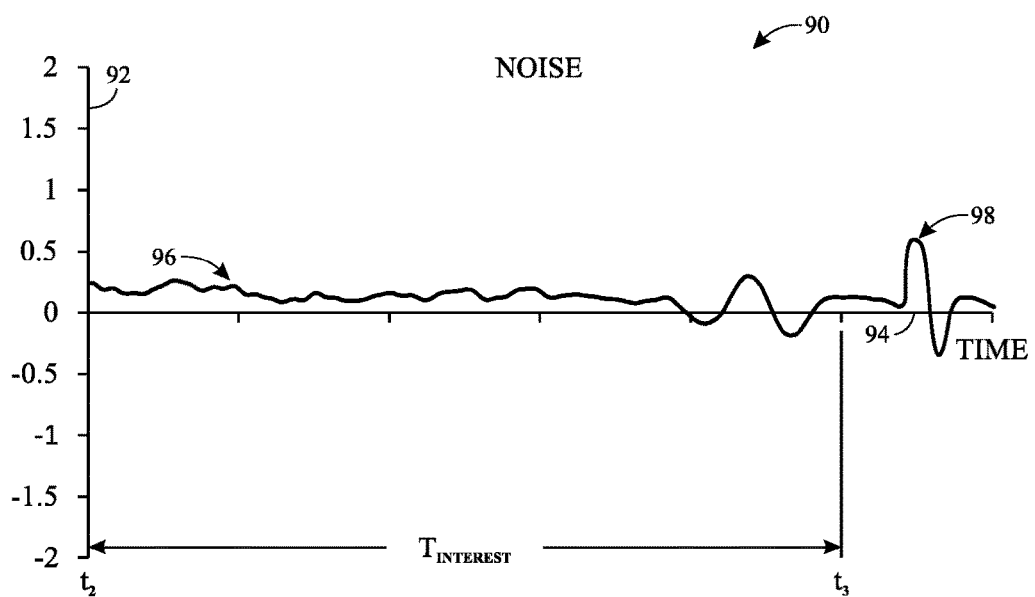
FIG. 6 is a plot of the second acoustic measurement obtained by the acoustic logging tool with the transducer oriented in the second direction in accordance with an embodiment.

For example, FIG. 6 is a plot 90 of the second acoustic measurement obtained by the acoustic logging tool 26 with the transducer 52 oriented in the second direction 55 with an ordinate 92 representing signal strength or amplitude in relation to an abscissa 94 representing time in accordance with an embodiment. The second acoustic measurement may take a form of a waveform of the plot 90 and include an echo portion 98. Because the second acoustic measurement was made with the transducer 52 displaced at the sufficiently further distance from the second acoustic surface (i.e., the second distance $d_2$ away from the second acoustic surface), the second acoustic measurement over the time period of interest $T_{interest}$, from a third time $t_2$ to a fourth time $t_3$, may not include the echo portion 76. The third time $t_2$ may be at or before a time that the transducer 52 emits the acoustic pulse 54. The fourth time $t_3$ may be at a time that is the time period of interest $T_{interest}$ elapsed from the third time $t_2$. While the second acoustic measurement may include the echo portion 98, the echo portion 98 may be outside the time period of interest $T_{interest}$ because the initial reflection 56 of the acoustic pulse emitted from the transducer 52 has not yet returned to the transducer 52 within the time period of interest $T_{interest}$. The second acoustic measurement may thus include the coherent noise component 96 within the time period of interest $T_{interest}$ because the noise caused by the electronics and/or the transducer 52 of the acoustic logging tool 26 may be measured within the period of interest $T_{interest}$. The second acoustic measurement over the period of interest $T_{interest}$ may be removed from the first acoustic measurement over the period of interest $T_{interest}$. Because the second acoustic measurement may include the coherent noise component 96, but not the echo portion 98, within the period of interest $T_{interest}$, and the first acoustic measurement may include the echo portion 76 and the coherent noise component within the period of interest $T_{interest}$, removing the second acoustic measurement from the first acoustic measurement over the period of interest $T_{interest}$ may result in the echo portion 76 filtered of the coherent noise.

Figure 7:
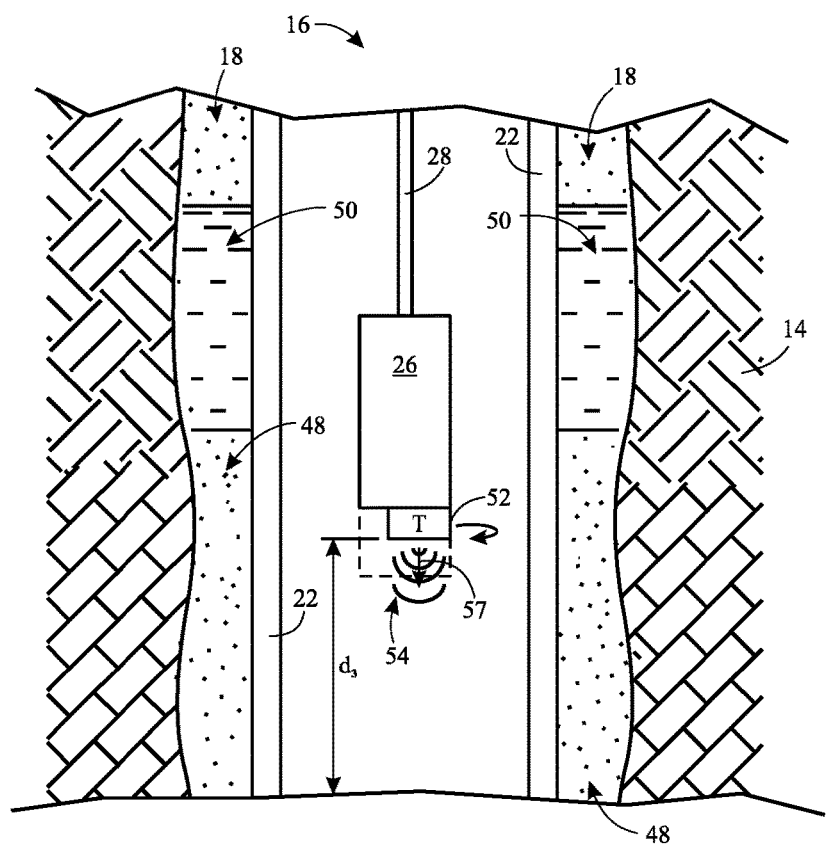
FIG. 7 is a schematic diagram of the acoustic logging tool with the transducer oriented in a third direction to obtain the second acoustic measurement in accordance with an embodiment.

In some embodiments, the second acoustic measurement is taken by angling the transducer 52 approximately downward in a third direction such that the second acoustic measurement is the sufficiently further distance away from the second acoustic surface. For example, the transducer 52 may be angled approximately 45° downward such that the second acoustic measurement is the sufficiently further distance away from the second acoustic surface. In some embodiments, the transducer 52 may be oriented approximately downward into the wellbore 16 such that the second acoustic measurement is the sufficiently further distance away from the second acoustic surface. For example, FIG. 7 is a schematic diagram of the acoustic logging tool 26 with the transducer 52 oriented approximately downward into the wellbore 16 in the third direction 57 to obtain the second acoustic measurement in accordance with an embodiment. In particular, the transducer 52 may be oriented approximately perpendicularly downward from the first direction 53 used to obtain the first acoustic measurement (as shown in FIG. 2). The transducer 52 may be displaced a third distance $d_3$ from the second acoustic surface (i.e., the bottom surface of the wellhole 16), such that the third distance $d_3$ may be measured in the third direction 57. Due to a depth of the wellhole 16, the third distance $d_3$ may be greater than the first distance $d_1$. In particular, the third distance $d_3$ is the sufficiently further distance from the second acoustic surface. The third distance $d_3$ may enable the second acoustic measurement to include the coherent noise component, but not include the echo portion 76, within the time period of interest $T_{interest}$. This may be because the initial reflection 56 of the acoustic pulse emitted from the transducer 52 has not yet returned to the transducer 52 within the time period of interest $T_{interest}$.

Figure 8:
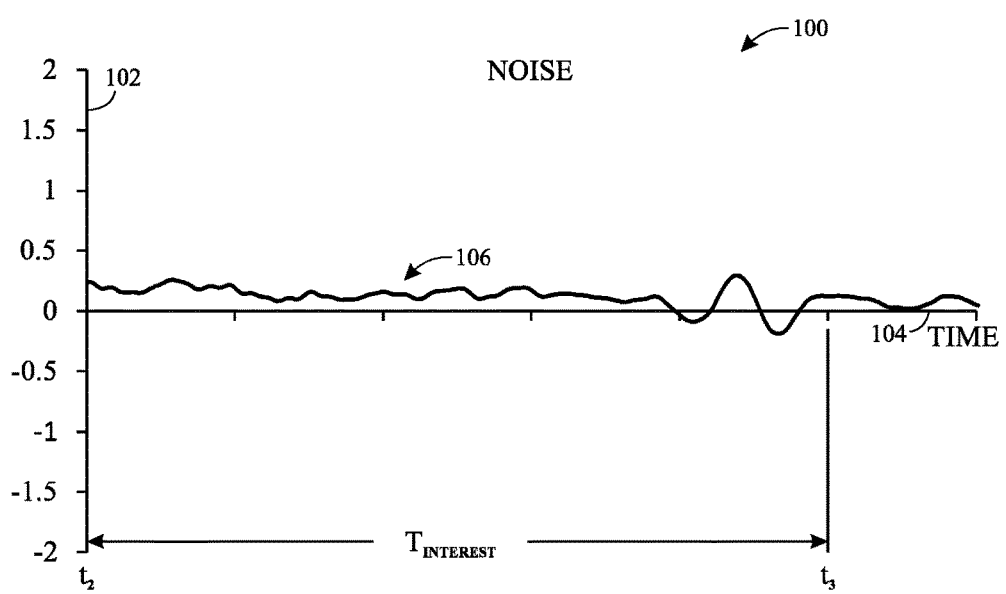
FIG. 8 is a plot of the second acoustic measurement obtained by the acoustic logging tool with the transducer oriented the third direction in accordance with an embodiment.

For example, FIG. 8 is a plot 100 of the second acoustic measurement obtained by the acoustic logging tool 26 with the transducer 52 oriented approximately downward into the wellbore 16 in the third direction 57 with an ordinate 102 representing signal strength or amplitude in relation to an abscissa 104 representing time in accordance with an embodiment. The second acoustic measurement may take a form of a waveform of the plot 100 and include an echo portion. Because the second acoustic measurement was made with the transducer 52 displaced at the sufficiently further distance from the second acoustic surface (i.e., the third distance $d_3$ away from the acoustic surface), the second acoustic measurement over the time period of interest $T_{interest}$, from third time $t_2$ to the fourth time $t_3$, may not include the echo portion 76. While the second acoustic measurement may include the echo portion, the echo portion may be outside the time period of interest $T_{interest}$ because the initial reflection 56 of the acoustic pulse emitted from the transducer 52 has not yet returned to the transducer 52 within the time period of interest $T_{interest}$. The second acoustic measurement may thus include the coherent noise component 106 within the time period of interest $T_{interest}$ because the noise caused by the electronics and/or the transducer 52 of the acoustic logging tool 26 may be measured within the time period of interest $T_{interest}$. The second acoustic measurement over the time period of interest $T_{interest}$ may be removed from the first acoustic measurement over the time period of interest $T_{interest}$. Because the second acoustic measurement may include the coherent noise component 106, but not the echo portion, within the time period of interest $T_{interest}$, and the first acoustic measurement may include the echo portion 76 and the coherent noise component within the time period of interest $T_{interest}$, removing the second acoustic measurement from the first acoustic measurement over the time period of interest $T_{interest}$ may result in the echo portion 76 filtered of the coherent noise.

Figure 9:
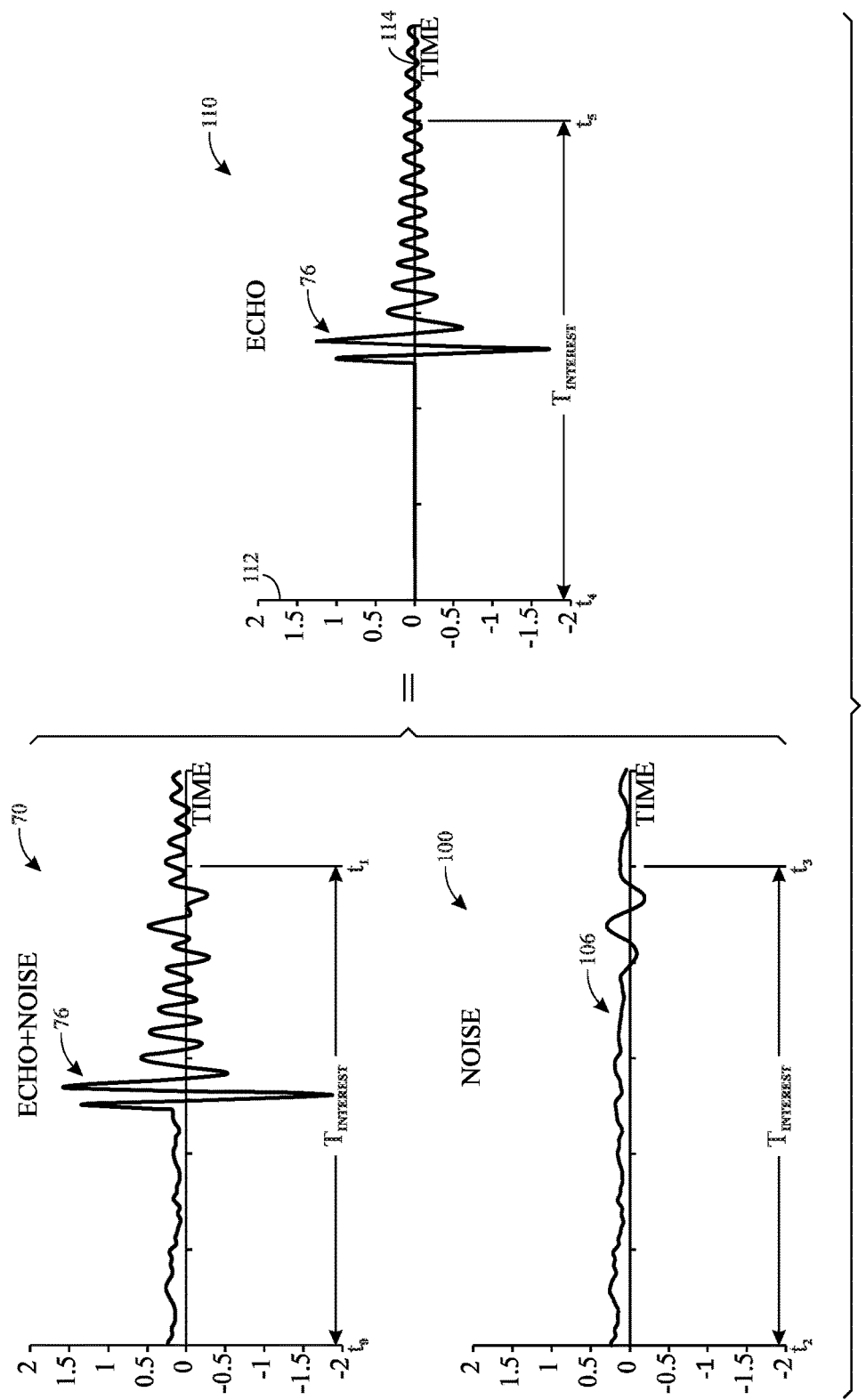
FIG. 9 is a diagram of three plots illustrating removing coherent noise from the first acoustic measurement in accordance with an embodiment.

With the foregoing in mind, FIG. 9 is a diagram of three plots 70, 100, 110 illustrating removing the coherent noise from the first acoustic measurement in accordance with an embodiment. The plot 110 includes an ordinate 112 representing signal strength or amplitude in relation to an abscissa 114 representing time. In particular, the first acoustic measurement as shown in the plot 70 may include the echo portion 76 and the coherent noise component over the time period of interest $T_{interest}$, from the first time to $t_0$ the second time $t_1$. Accordingly, the first acoustic measurement over the time period of interest $T_{interest}$ may include at least the echo portion 76. The second acoustic measurement as shown in the plot 100 may include the coherent noise component over the time period of interest $T_{interest}$, from the third time $t_2$ to the fourth time $t_3$, but not the echo portion. This is because the initial reflection 56 of the acoustic pulse emitted from the transducer 52 has not yet returned to the transducer 52 within the time period of interest $T_{interest}$. Removing the second acoustic measurement from the first acoustic measurement over the time period of interest $T_{interest}$ may result in the echo portion 76 filtered of the coherent noise over the time period of interest $T_{interest}$, from a fifth time $t_4$ to a sixth time $t_5$, as shown in the plot 110. The fifth time $t_4$ may correspond to a time at or before the transducer 52 emits the acoustic pulse 54 (e.g., when obtaining the first acoustic measurement and/or the second acoustic measurement). The sixth time $t_5$ may be at a time that is the time period of interest $T_{interest}$ elapsed from the fifth time $t_4$.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
   an acoustic logging tool comprising a transducer, wherein the transducer is configured to:
      emit a first acoustic pulse from the transducer in a first direction toward a first acoustic surface;
      measure a first acoustic signal for at least a first amount of time after emitting the first acoustic pulse, wherein the first acoustic signal over the first amount of time comprises a coherent noise component and a first echo component, wherein the first echo component is due at least in part to an interaction of the first acoustic pulse with the first acoustic surface;
      emit a second acoustic pulse from the transducer in a second direction, wherein the second direction is at least partly directed away from the first acoustic surface; and
   measure a second acoustic signal for at least the first amount of time after emitting the second acoustic pulse, wherein the second acoustic signal over the first amount of time comprises substantially only the coherent noise component, wherein the second acoustic signal comprises a second main echo component that occurs after the first amount of time, wherein the second main echo component is due at least in part to an interaction of the second acoustic pulse with the second acoustic surface; and
   a data processing system communicatively coupled to the acoustic logging tool, wherein the data processing system comprises a processor, wherein the processor is configured to:
      receive the measurement of the first acoustic signal and the measurement of the second acoustic signal; and
      remove the measurement of the second acoustic signal over the first amount of time from the measurement of the first acoustic signal over the first amount of time to reduce coherent noise from the measurement of the first acoustic signal.

2. The system of claim 1, wherein the transducer is configured to emit a sonic pulse.

3. The system of claim 1, wherein the transducer is configured to emit an ultrasonic pulse.

4. The system of claim 1, wherein the transducer physically oriented in the first direction to emit and measure the first acoustic pulse, and physically reoriented to the second direction to emit and measure the second acoustic pulse.

5. The system of claim 4, wherein the second direction is approximately 180 degrees from the first direction.

6. The system of claim 4, wherein the second direction is approximately 90 degrees from the first direction.

7. A method comprising:
   orienting a transducer of an acoustic logging tool such that an end of the transducer is directed at a first acoustic surface a first distance from the end of the transducer, wherein the end of the transducer comprises an emission or detection end of the transducer;
   emitting a first acoustic pulse from the end of the transducer at a first time;
   measuring a first acoustic signal comprising a first echo of the first acoustic pulse due to an interaction of the first acoustic pulse with the first acoustic surface using the transducer at or before a second time;
   obtaining, with a processor, the measurement of the first acoustic signal between the first time and the second time;
   orienting the transducer such that the end of the transducer is directed at a second acoustic surface a second distance from the end of the transducer, wherein the second distance is greater than the first distance;

emitting a second acoustic pulse from the end of the transducer at a third time;

measuring a second acoustic signal using the transducer at or before a fourth time, wherein the second acoustic signal comprises a second echo due to an interaction of the second acoustic pulse with the second acoustic surface, wherein the second echo occurs after the fourth time;

obtaining, with the processor, the measurement of the second acoustic signal between the third time and the fourth time; and removing, with the processor, at least part of the measurement of the second acoustic signal from the measurement of the first acoustic signal to reduce coherent noise from the measurement of the first acoustic signal.

8. The method of claim 7, wherein the transducer is not centered in the acoustic logging tool.

9. The method of claim 8, wherein orienting the transducer such that the end of the transducer is directed at the second acoustic surface comprises orienting the transducer in a direction approximately 180 degrees from the direction the transducer was oriented when emitting the first acoustic pulse.

10. The method of claim 7, wherein the acoustic logging tool is displaced in a casing or a wellbore, and the first acoustic surface is the casing or a wall of the wellbore.

11. The method of claim 10, wherein the second acoustic surface is the casing or the wall of the wellbore.

12. The method of claim 11, wherein orienting the transducer such that the end of the transducer is directed at the second acoustic surface comprises orienting the transducer in a direction approximately 180 degrees from the direction the transducer was oriented when emitting the first acoustic pulse.

13. The method of claim 10, wherein the second acoustic surface comprises a bottom of the wellbore.

14. The method of claim 13, wherein orienting the transducer such that the end of the transducer is directed at the second acoustic surface comprises orienting the transducer in a direction that is perpendicularly downward from the direction the transducer was oriented when emitting the first acoustic pulse.

15. An article of manufacture comprising one or more tangible, non-transitory machine-readable media comprising instructions to:

receive a measurement of a first acoustic signal resulting when a transducer of a downhole tool emits a first acoustic pulse in a first direction toward a first surface in a wellbore, wherein the measurement of the first acoustic signal comprises at least a first amount of time after the emission of the first acoustic pulse, wherein the first acoustic signal over the first amount of time comprises a coherent noise component and a first echo component, wherein the first echo component is due at least in part to an interaction of the first acoustic pulse with the first surface in the wellbore;

receive a measurement of a second acoustic signal resulting when the transducer of the downhole tool emits a second acoustic pulse in a second direction, wherein the second direction is at least partly directed away from the first acoustic surface, wherein the measurement of the second acoustic signal comprises at least the first amount of time after the emission of the second acoustic pulse, wherein the second acoustic signal over the first amount of time comprises substantially only the noise component, wherein the second acoustic signal comprises a second main echo component that occurs after the first amount of time, wherein the second main echo component is due at least in part to an interaction of the second acoustic pulse with the second acoustic surface; and remove the measurement of the second acoustic signal over the first amount of time from the measurement of the first acoustic signal over the first amount of time to reduce coherent noise from the measurement of the first acoustic signal.

16. The article of manufacture of claim 15, wherein the noise component of the measurement of the first acoustic signal and the measurement of the second acoustic signal comprises coherent noise.

17. The article of manufacture of claim 15, wherein the removal of the measurement of the second acoustic signal from the measurement of the first acoustic signal comprises removal in the time domain.

18. The article of manufacture of claim 15, wherein the removal of the measurement of the second acoustic signal from the measurement of the first acoustic signal comprises removal in the frequency domain.

* * * * *